United States Patent
Ling et al.

Patent Number: 6,058,833
Date of Patent: May 9, 2000

[54] AUTOMATIC GRATER FOR PRODUCING FOOD PASTE

[76] Inventors: Kuo-I Ling, 9F. No.12, Alley 31, Lane 105, Sec.2, Chung Haiao Rd.; Rong-Yuan Tseng, 2F. No.3, Lane b5, Sec.2, Chung Haiao Rd., both of San Chorng City, Taipei Hsien, Taiwan

[21] Appl. No.: 09/379,302

[22] Filed: Aug. 23, 1999

[51] Int. Cl.[7] .............................. A23N 1/00; A23N 1/02; A23L 1/212; B02C 7/12

[52] U.S. Cl. ................................ 99/510; 99/495; 99/513; 241/37.5; 241/92; 241/261; 241/261.1

[58] Field of Search ..................... 99/286, 495, 509–513, 99/574–576; 241/260.1, 261, 261.1, 261.3, 273.2, 37.5, 92, 101.1, 101.2; 100/134, 213; 366/83–85, 272, 297, 314

[56] References Cited

U.S. PATENT DOCUMENTS

| | | | |
|---|---|---|---|
| 3,533,563 | 10/1970 | Eriksson | 241/261 |
| 3,799,522 | 3/1974 | Loomans | 366/85 |
| 4,025,056 | 5/1977 | Miles et al. | 366/272 |
| 4,073,013 | 2/1978 | Blach | 366/601 |
| 4,506,601 | 3/1985 | Ramirez et al. | 99/513 |
| 4,613,086 | 9/1986 | Granum et al. | 241/261.1 |
| 4,874,136 | 10/1989 | Webster | 241/261 |
| 4,924,770 | 5/1990 | Raub | 99/510 |
| 5,031,522 | 7/1991 | Birixel et al. | 99/511 |
| 5,193,448 | 3/1993 | Antonio | 99/512 |
| 5,353,697 | 10/1994 | Venturati et al. | 99/492 |
| 5,433,144 | 7/1995 | Lee | 99/513 |
| 5,452,650 | 9/1995 | Lee | 99/510 |

*Primary Examiner*—Timothy Simone
*Attorney, Agent, or Firm*—Pro-Techtor International Services

[57] ABSTRACT

An automatic grater for producing vegetable and fruit paste mainly includes a grating disc and a rotational retainer screwed around a motor rotational shaft to rotate at high speed along with the rotational shaft. Vegetable and/or fruit can be fed into the grater to contact with the rapidly rotated grating disc and be grated into paste that falls in the also rapidly rotated rotational retainer. The paste is thrown by a centrifugal force to pass a side opening between a lid and the rotational retainer and be collected in a paste collector connected to the side opening.

1 Claim, 2 Drawing Sheets

AUTOMATIC GRATER FOR PRODUCING FOOD PASTE

BACKGROUND OF THE INVENTION

The present invention relates to an automatic grater for producing food paste. The grater of the present invention is an improvement made to an invention of the same applicant entitled "A Juice-extractor also Serving as a Grinder" that has been granted a U.S. Pat. No. 5,761,993.

General consumers would usually use a blender or a juice-extractor to mesh vegetable and/or fruit in order to obtain a paste thereof. When doing so, it necessitates the adding of water into the blender or the juice-extractor and takes a considerable time to have the vegetable and/or fruit finely meshed. In the case of a juice-extractor, some active materials contained in the food would be destroyed after the food is cut by blades rotated at very high speed, and the meshed vegetable and/or fruit would lose the original good flavor because of the added water. Moreover, the vegetable and/or fruit is not always evenly cut or meshed. The meshed vegetable and/or fruit must be scooped from the container of the blender or the juice-extractor and transferred to another separate container for use.

SUMMARY OF THE INVENTION

A primary object of the present invention is to provide an automatic grater for conveniently producing food paste. Vegetable and/or fruit may be fed into the grater via a top opening on a lid thereof. A grating disc and a retainer receiving the grating disc are mounted around a motor rotational shaft upward projected from a base to rotate along with the shaft at high speed. Vegetable and/or fruit fed into the grater is grated by the rapidly rotated grating disc into paste without the need of adding any water. The produced vegetable/fruit paste is thrown by a centrifugal force from the rapidly rotated retainer to a side opening on the lid and is directly collected in a paste collector removably connected to the side opening.

BRIEF DESCRIPTION OF THE DRAWINGS

The features and novelty of the present invention can be best understood by referring to the following detailed description of the preferred embodiments and the accompanying drawings, wherein.

DETAILED DESCRIPTION OF THE PREFERRED EMBODIMENTS

Figure 1:
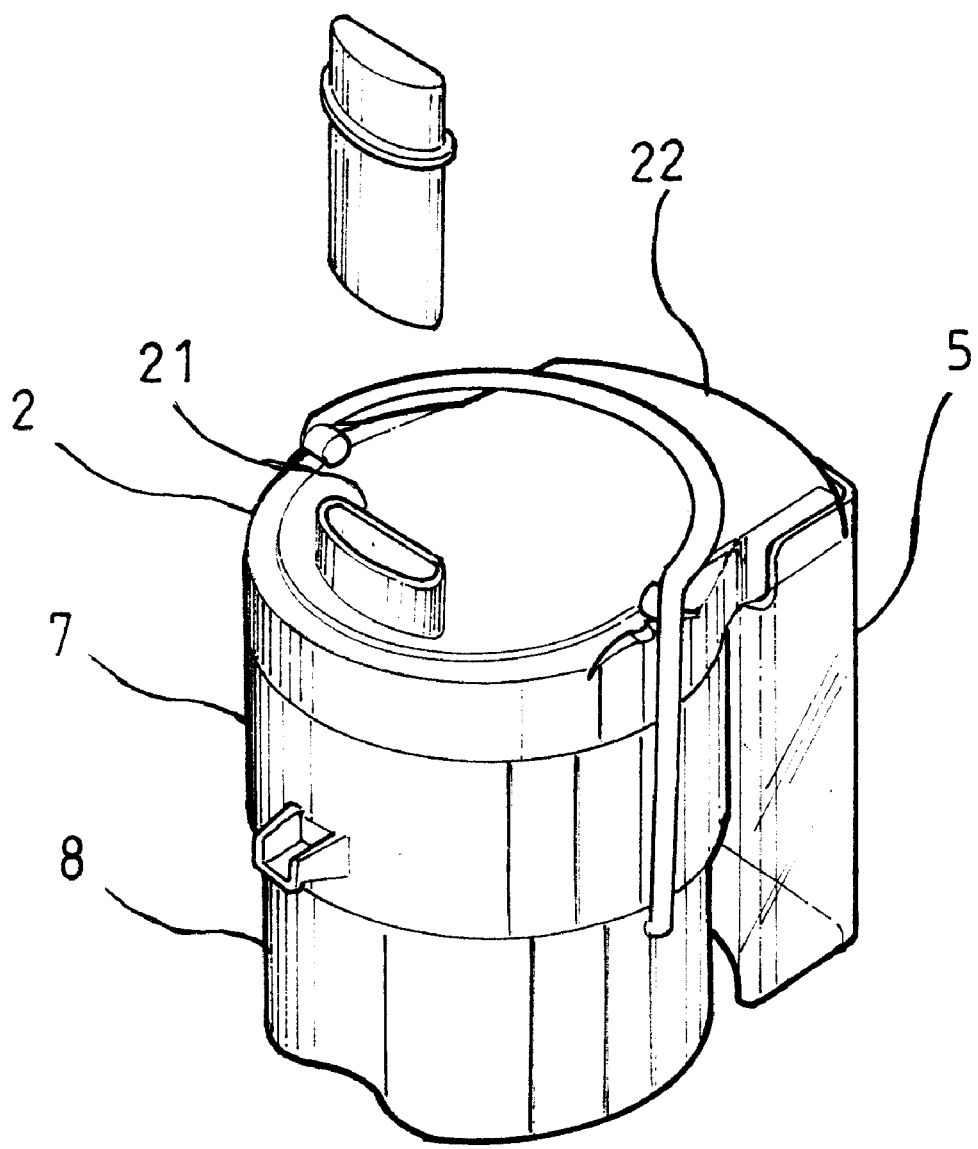
FIG. 1 is an assembled perspective of a grater for producing food paste according to the present invention.
Figure 2:
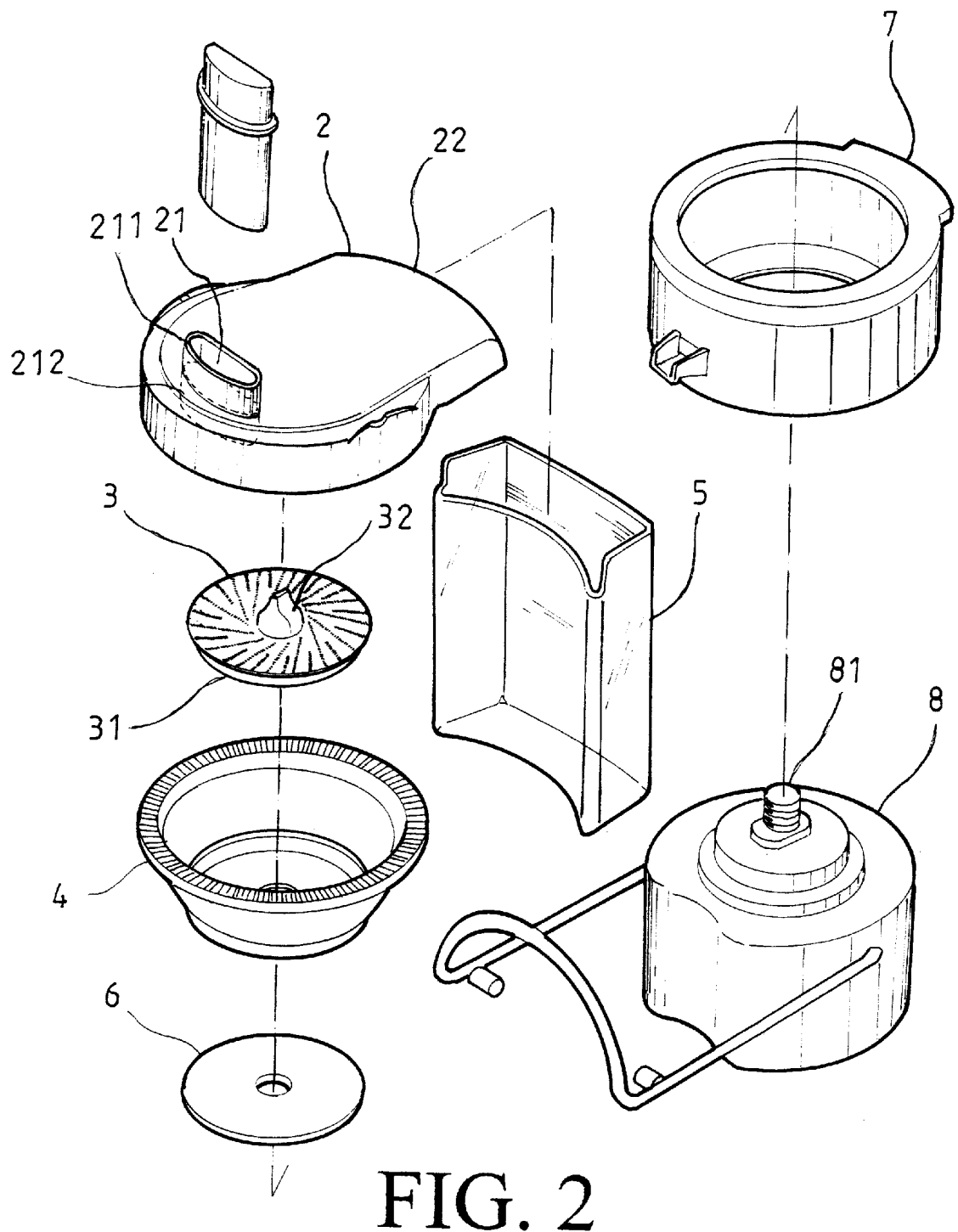
FIG. 2 is an exploded perspective of the grater for producing food paste shown in FIG. 1.

Please refer to FIGS. 1 and 2 at the same time. The present invention relates to an automatic grater for producing food paste. The grater mainly includes a lid 2, a grating disc 3, a rotational retainer 4, a paste collector 5, a bottom plate 6, a flow guide 7, and a base 8.

The lid 2 is a flat member and has a curved feeding opening 21 provided at one end of a top surface thereof. Walls 211, 212 extend upward and downward, respectively, from an outer periphery of the feeding opening 21 by a suitable length. An extension 22 projects from another end of the lid 2 opposite to the curved feeding opening 21.

The grating disc 3 includes a circular seat 31 at a bottom side thereof, and an upward projected central portion that forms an internally threaded head 32.

The rotational retainer 4 has a closed peripheral wall defining a space for receiving the grating disc 3 therein.

The base 8 has a motor (not shown) mounted therein. A rotational shaft 81 of the motor projects from a top center of the base 8.

The grating disc 3, the rotational retainer 4, the bottom plate 6, and the flow guide 7 are sequentially positioned on the top of the base 8 around the rotational shaft 81. The internally threaded head 32 of the grating disc 3 is tightly screwed to the rotational shaft 81, so that the grating disc 3 and the rotational retainer 4 rotate along with the rotational shaft 81 when the motor is started.

After the above-mentioned elements 2, 3, 4, 6, and 7 are assembled onto the base 8, the paste collector 5 is disposed below the extension 22 of the lid 2.

Vegetable and fruit may be fed into the grater via the curved feeding opening 21 on the lid 2 to contact with the grating disc 3. When the motor is started, the grating disc 3 will rotate at high speed to grate the vegetable or fruit forced toward it via the feeding opening 21, so that the vegetable or the fruit is grated into paste and falls into the rotational retainer 4. Since the rotational retainer 4 has closed peripheral wall and is rotated at high speed by the motor, the paste of the grated vegetable and/or fruit in the rotational retainer 4 is thrown by a centrifugal force toward a side opening defined between the extension 22 of the lid 2 and the closed peripheral wall of the rotational retainer 4 and discharged into the paste collector 5 disposed below the extension 22. After the grating is completed, the paste collector 5 may be removed from the extension 22 to pour out the vegetable and/or fruit paste for use.

With the above arrangements, the grater of the present invention can be easily operated to automatically grate vegetables and fruits into paste within a very short time. The grater of the present invention is therefore practical for use.

What is claimed is:

1. An automatic grater for producing food paste, comprising a base having a motor mounted therein and a motor rotational shaft projected from a top center thereof, a grating disc, a rotational retainer, and a bottom plate sequentially positioned in a flow guide that is mounted on a top of said base around said rotational shaft, a lid closing a top of said flow guide, and a paste collector disposed below one side of said lid;

said lid including a flat top surface and a curved feeding opening provided at one end of the top surface, walls extending upward and downward, respectively, from an outer periphery of said curved feeding opening by a suitable length, and a portion of said top surface opposite to said curved feeding opening projecting outward to form an extension, and said paste collector being disposed below said extension; and said grating disc including a circular seat at a bottom side thereof and an upward projected central portion that forms an internally threaded head, and being disposed in a space defined by a closed peripheral wall of said rotational retainer, said internally threaded central head being tightly screwed onto said motor rotational shaft projected from said rotational retainer, so that said grating disc and said rotational retainer are brought by said rotational shaft to rotate at high speed when said motor is started;

whereby vegetable and/or fruit can be fed into said grater via said curved feeding opening on said lid to contact with said grating disc rotating at high speed and therefore be grated into paste, said paste falling in said rotational retainer that is also rotating at high speed and being thrown outward by a centrifugal force to pass a side opening between said extension of said lid and the closed peripheral wall of said rotational retainer and be collected in said paste collector disposed below said extension of said lid.

\* \* \* \* \*